(No Model.)
P. WEISEL.
DISK FOR REFRIGERATING AND HEATING PIPES.
No. 440,671. Patented Nov. 18, 1890.
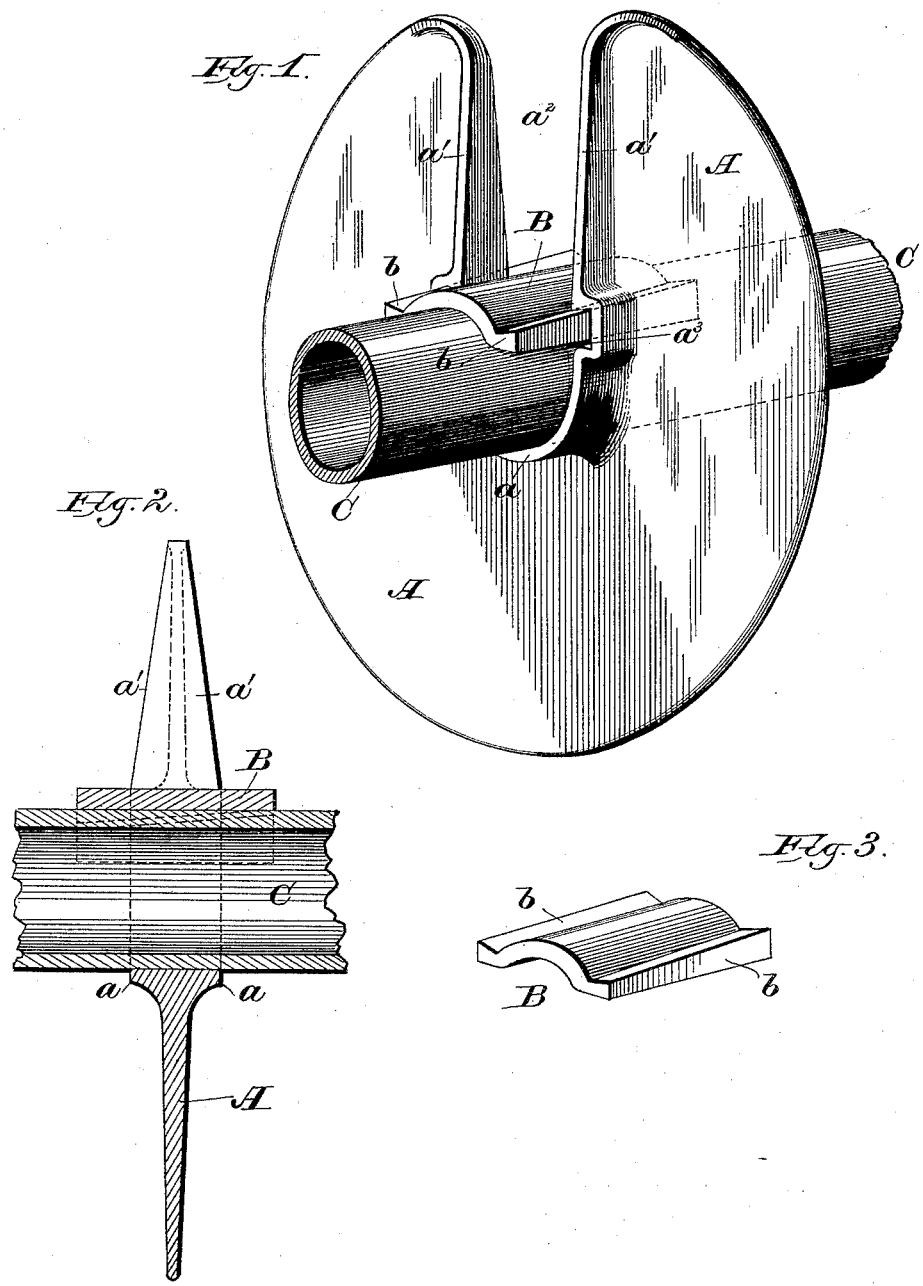

UNITED STATES PATENT OFFICE.

PETER WEISEL, OF MILWAUKEE, WISCONSIN.

DISK FOR REFRIGERATING AND HEATING PIPES.

SPECIFICATION forming part of Letters Patent No. 440,671, dated November 18, 1890.

Application filed January 13, 1888. Serial No. 260,676. (No model.)

*To all whom it may concern:*

Be it known that I, PETER WEISEL, of the city and county of Milwaukee, and State of Wisconsin, have invented certain new and useful Improvements in Disks for Refrigerating and Heating Pipes; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The objects of my invention are to increase the radiating or heat-absorbing surface of heating or refrigerating pipes or coils, to facilitate the attachment or removal of disks to or from such pipes or coils, to simplify and cheapen the construction of such disks, &c.

It consists, essentially, of a disk formed with a central perforation open on one side to receive the pipe and with key-seats, and a key adapted to said seats and arranged to draw and secure the disk snugly upon the pipe.

In the accompanying drawings like letters designate the same parts in the several figures.

Figure 1 is a perspective view of my improved device and a portion of a pipe to which it is attached. Fig. 2 is a cross-section of the same taken axially through the pipe, and Fig. 3 is a perspective view of the key.

Pipes or coils employed for the circulation of a cooling medium, particularly gases—such as ammonia-gas—which are worked under high pressure, require strong tight couplings which it is not desirable to disturb. At the same time it is desirable to increase the efficiency of such pipes or coils and to prevent the accumulation of ice thereon by providing an additional radiating or heat-absorbing surface. To this end I provide a disk A, formed with a central perforation to receive the pipe C, and a lateral slot or opening $a^2$ into said central perforation to permit of its being placed upon or removed from said pipe without disturbing the latter or its couplings. Said disk is provided around its central opening with a hub or flanges $a\ a$, adapted to present a broad surface in contact with the pipe. The edges of the disk on each side of the lateral opening or slot $a^2$ are preferably stiffened by flanges $a'\ a'$, forming continuations of the hub or flanges $a\ a$ around the central perforation.

B is a key concaved to fit over a portion of the pipe C, and formed at the edges with tapering tongues adapted to engage tapering dovetailed grooves or seats $a^3$, formed for that purpose in opposite sides of the central opening or hub $a\ a$ of the disk A. The disk A is readily placed upon a pipe which enters the central perforation through the side opening $a^2$, and the key B inserted through said opening, and its tapering tongues $b\ b$ forced into the similarly-shaped seats $a^3$, draws the concave portion of said key and the hub $a$ of the disk snugly against the pipe. The disk may be as readily detached and removed from the pipe by removing said key B.

I claim—

1. The combination, with a pipe, of a disk having a lateral slot or opening for the reception of the pipe and transverse grooves on opposite sides of said opening, and a key adapted to engage said grooves and secure said disk upon said pipe, substantially as and for the purposes set forth.

2. The combination, with a pipe, of a metallic disk formed in a single piece with a lateral slot and transverse tapering grooves on each side of said slot, and a key having tapering tongues on its sides adapted to engage said grooves and secure said disk upon its pipe, substantially as and for the purposes set forth.

3. The combination of a disk having a semicircular seat and a slot extending therefrom through one edge of the disk with seats in the opposite edges of said slot, and a concaved key adapted to be inserted in the direction of the axis of said disk in the seats formed in the opposite edges of said slot, substantially as and for the purposes set forth.

In testimony that I claim the foregoing as my own I affix my signature in presence of two witnesses.

PETER WEISEL.

Witnesses:
CHAS. L. GOSS,
ERNST VITTER.